United States Patent [19]

Huisen

[11] Patent Number: 4,929,077
[45] Date of Patent: May 29, 1990

[54] INTERFEROMETRIC RANGE FINDER

[75] Inventor: André Huisen, Lüchingen, Switzerland

[73] Assignee: Wild Leitz AG, Switzerland

[21] Appl. No.: 171,715

[22] Filed: Mar. 22, 1988

[30] Foreign Application Priority Data

Mar. 24, 1987 [CH] Switzerland ............... 1113/87

[51] Int. Cl.$^5$ ............................................. G01B 9/02
[52] U.S. Cl. ..................................... 356/4.5; 356/358
[58] Field of Search ..................... 356/4.5, 345, 358

[56] References Cited

U.S. PATENT DOCUMENTS 4,589,772  5/1986  Patteu et al. ............... 356/345 X

FOREIGN PATENT DOCUMENTS 3137211  5/1982  Fed. Rep. of Germany.
3247238  7/1983  Fed. Rep. of Germany.
3445254  6/1986  Fed. Rep. of Germany.
 715928  2/1980  U.S.S.R. ....................... 356/4.5
2084315  7/1982  United Kingdom.

OTHER PUBLICATIONS

Medovikov et al., "Use of Semiconductor Lasers in Geodesic Interference Measurements of Distances", *Sov. J. Quat. Elec.*, vol. 9, No. 11, pp. 1459–1460, 11/79.
VDI Berichte 548 (1985), pp. 35–36.
M. Alonso, E. J. Finn, "Fundamental University Physics", vol. II, Addison-Wesley Reading, 1973, pp. 860–863.
Gerthsen, Knesver, Vogel, "Physik", Springer 1974, 12th edition, pp. 596–597.
Y. Vaisala, "Über die Langenmessung mit Hilfe der Lichtinterferenz", zeitschrift für Instrumentenkunde, Aug. 17, 1927, pp. 398–402.

*Primary Examiner*—Davis L. Willis
*Assistant Examiner*—Matthew W. Koren
*Attorney, Agent, or Firm*—Roylance, Abrams, Berdo & Goodman

[57] ABSTRACT

In a range finder for measuring absolute distances, a time partially coherent light source is provided. A beam emitted by it is split into a reference beam (B), which passes along a reference path, and a testing or measuring beam (A), which can be focused onto a testpiece (4). The radiation (A') reflected by the testpiece is brought to interference with the reference beam (B). In a position-sensitive detector array, the testing and reference beam are superimposed. The coherence of the two waves is directly determined from the intensity distribution on the detector array. The distance of the test-piece is calculated from the intensity distribution on the detector. Preferably, upstream of the detector array is connected an optical grating (6) with a grating spacing at least approximately corresponding to the spacing of the interference fringes on the detector array. The instrument makes it possible to perform approximate measurements and in direct change measurements with maximum precision within a very short time, without any changes or conversions having to be carried out on the measuring means. (FIG. 1).

13 Claims, 3 Drawing Sheets

INTERFEROMETRIC RANGE FINDER

The invention relates to a range finder for measuring absolute distances according to the preamble of claim 1.

Instruments for electrooptical distance measurement or range finding are known, which contain a transmitter for emitting modulated light bundles and a receiver, e.g. at the location of the transmitter, in which the light bundles reflected by the target are received and compared with the emitted light bundles. The result of a corresponding comparison operation between the two signals is used for calculating the distance between the transmitter and the reflected target. Such methods and apparatuses are generally based on the principle of travel-time measurement or phase comparison between the transmission and reception signal. Although such methods and apparatuses have been improved in various ways of late, in order to eliminate the different influences of errors, particularly phase errors, the measuring precision is limited to a few tenths of a millimeter.

If the measuring instrument is to be e.g. used industrially for the precise surveying of machine parts or components, it is necessary to increase the precision into the $\mu$m range. In principle, interference comparators would be appropriate for this range, but suffer from significant disadvantages with regards to practical use, namely a particularly high coherence requirement on the light source, so that a complicated component is necessary, together with a high stability of the mechanical structure and the costs associated therewith. In addition, they either only have the possibility of comparison measurements and not absolute measurements when using single frequency systems, or a large number of different frequencies are required for absolute measurements. These restrictions mean such a high demand on the components and construction of a corresponding measuring instrument, that the massive manufacturing costs are prejudicial to the use of such an instrument, e.g. in industrial production installations.

The problem of the present invention is therefore to provide a range finder, which covers a maximum measuring range and which still has a measuring accuracy in the $\mu$m range. In addition, commercially available and simple components are to be used, so that the instrument can be manufactured at an acceptable cost, so that it can be used in large numbers, e.g. also in production plants.

The decisive advantage of these measures is the particularly effective use of simple, inexpensive components and the possibility of choosing the measuring accuracy in virtually random manner in the $\mu$m range. The measurement evaluation can take place automatically using a computer and a corresponding evaluation program. The sighted target does not have to have particularly high reflection characteristics, because as a result of the system the signal-to-noise ratio is well above that of the hitherto used instruments. The measuring process takes place very rapidly, so that the measuring result is available substantially immediately and without any time lag.

The invention is described in greater detail hereinafter relative to non-limitative embodiments and the attached drawings, which show:

FIG. 1 the diagrammatic representation of an embodiment.

FIG. 2 the principle of the optical path for explaining the operation of the invention.

FIG. 3 the position-dependent course of the intensity distribution after superimposing the reference and measuring beam.

FIG. 4 the line pattern of the intensity distribution on the surface of the diode array according to FIG. 1.

FIG. 5 the optical path of another embodiment.

FIG. 6 the example of an evaluation circuit for the detector signals.

FIG. 1 diagrammatically shows the optical path of a range finder based on an interferometer. There is a light source 1 for which in the present case use is made of a multimode laser diode with time partially coherent radiation. The beam from light source 1 is split into a measuring beam A and a reference beam B in a beam splitter 2. Measuring beam A is focused with the aid of an objective or lens 3 onto a target 4, from which the beam is reflected and pass through an optical collecting lens 5. The returning beam is then projected by a grating 6 onto a pin diode array 7 located behind it.

A photoelectric scanning of the image on the array surface takes place in diode array 7. In the preferred example, the reference beam B passes through an adjustable multiple reflector 8 and subsequently a mirror 9 and is also reflected by the latter onto grating 6 and photodiode array 7. In the latter the reference beam B is superimposed on the measuring beam A' reflected by target 4. Mirror 9 is constructed as an oscillating mirror and in the present example the oscillation amplitude is at the most approximately 1 $\mu$m.

The multiple reflector 8 can be constituted by a multiple mirror arrangement or some other suitable cavity resonator, e.g. supplemented by a glass fibre arrangement. All the components used are simple and therefore inexpensive optical elements.

FIG. 2 shows in simplified form the principle of the arrangement according to FIG. 1 and as a result of which the measuring process is made plausible. FIG. 2 shows the main components of the arrangement, namely light source 1, beam splitter 2, reference path L1, L1' with mirror 9 and measuring path L2, L2' with the target 4 represented by a mirror. The diode array 7 with the grating 6 in front of it is represented by a screen S in FIG. 2. If L is the path length between light source 1 and beam splitter 2, then the reference path R1 is formed from the sum of the path lengths L+L1+L1'. The measuring path R2 is R2=L+L2+L2'. If both beams strike screen S at point X, then the electrical field on the screen surface is formed from the two partial fields of the reference beam and the measuring beam. The resultant electrical field is a function of the spectrum of light source 1 and the lengths of the reference path R1 or measuring path R2.

The light intensity at point X on screen S is proportional to the mean square of the amount of the sum of the two partial fields. The difference of the path lengths of the reference path and the measuring path is dependent on the position X on screen S.

Assuming the simplifying conditions that the optics do not resolve the source, the reference beam and measuring beam can be represented by plane waves, the polarization plane is at right angles to the drawing plane and the spectral distribution of the radiation/$g(\omega)/^2$ emitted by the source, with $\omega$ being the cyclic frequency of the radiation, being approximately symmetrical about $\omega_o$, as a result of per se known mathematical considerations the modulation amplitude or the contrast of the interference fringes occurring on the detector is proportional to $$G(R_1-R_2)=\int d\omega/g(\omega_0+\omega)/^2 \cos[\omega(R_1-R_2)/c]$$

in which c is the speed of light. However, the aforementioned conditions are not generally important for the operation of the instrument.

For the intensity distribution I(X) along the X-axis, which corresponds to the position-sensitive direction of the detector array, the following applies under the above conditions:

$$I(X)=I_r(X)+I_p(X)+2[I_r(X)I_p(X)]^{0.5}G(R_1-R_2)\cos[k_o(R_1-R_2)]$$

in which $k_o$ is the average wave number of the light used and $I_r$ and $I_p$ are the intensity proportions from the reference or measuring beam.

Figure 1:
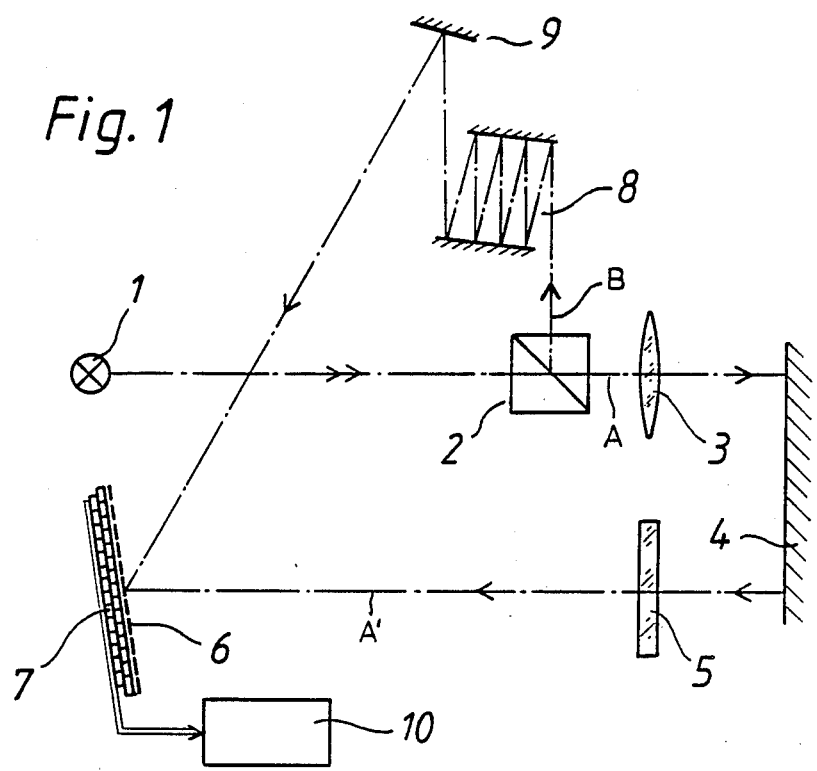
Figure 2:
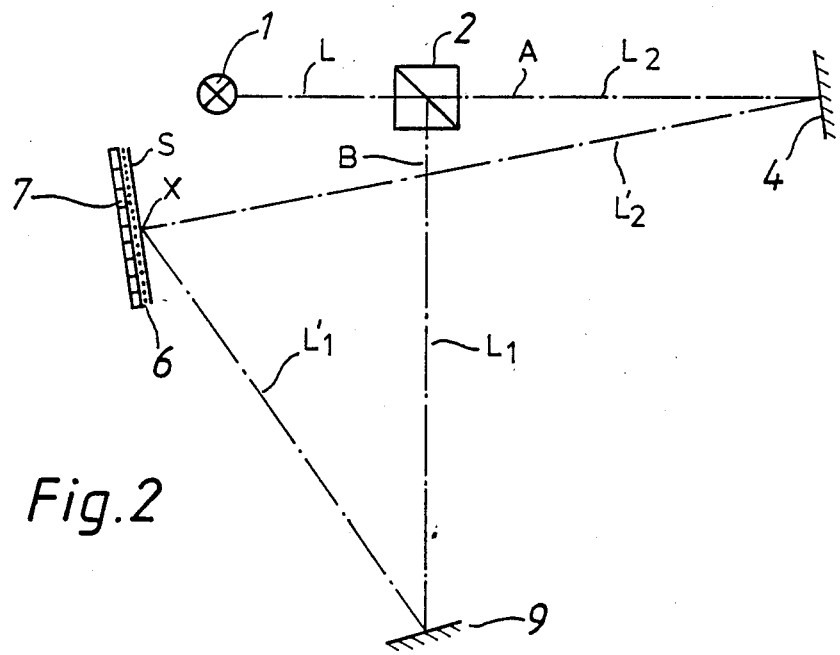

If in FIG. 2 target 4 is moved, then there is also a displacement of the contrast maximum on screen S. Thus, conclusions can be drawn concerning the position of target 4 from the position of the contrast maximum of the intensity strips on screen S. This constitutes the principle of range finding through the arrangement according to FIG. 1. The position determination of the contrast maximum takes place automatically by program-controlled evaluation of the signals supplied by the diode array.

The distance between the individual intensity strips on screen S is a function of the wavelength of the light source used and the angle under which the reference and measuring beam strike screen S. The strip spacing d is in the form $$d=2\pi/[k_o(\sin a-\sin b)]$$

in which a and b represent the angles between the screen normal and the propagation directions of the measuring and reference beams. The values for d are in the micrometer range. The width W of the envelope curve $G(R_1-R_2)$ is inversely proportional to $k_o$ and the relative spectral width of the light source used. Typical values for W are a few tenths of a millimeter.

If, according to the invention, the screen S of FIG. 2 is replaced by the grating 6 of FIG. 1, in which the grating constant must be the same as the strip spacing d and if also the mirror 9 is periodically oscillated, then behind the grating, i.e. on the diode array 7, there is an intensity fluctuation proportional to the envelope curve $G(R_1-R_2)$. This changing intensity signal is detected by the diode array 7 and is evaluated, preferably in program-controlled manner, in the following evaluating means 10.

Figure 5A:
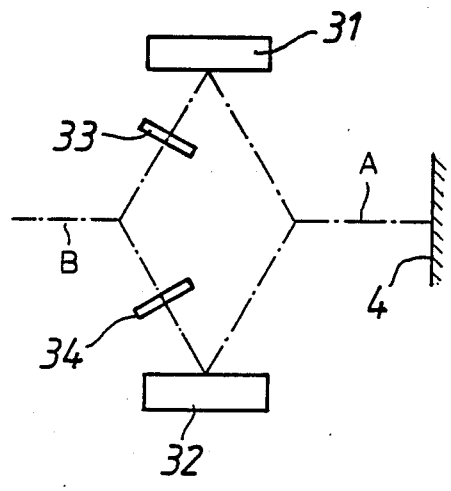

In the previously described arrangement the band width of the useful signal can become large if the target moves, which can lead to a sensitivity loss. This phenomenon can be removed if e.g. the reference beam, as shown in FIG. 5A, is split into two parts, which are frequency-displaced by amounts Δf by frequency-displacing elements 33,34 and are deflected to two different detector arrays 31,32. The signals of the two detectors 31,32 are mixed and of the mixed signal only the component in a narrow frequency range around Δf is measured. The amplitude of this component is proportional to the square of the envelope curve $G(R_1-R_2)$ and can again be used for range finding purposes. This detection principle has the advantage that the necessary band width can be smaller by a factor k W on moving the target.

In particular by using at least one beam splitter, the reference or measuring wave can be split into N parts and different wavelengths can be associated with the individual partial beams, after which they are superimposed on the detector array in such a way that on observing a point on the detector the nth part passes along a path length c+n a if n is smaller than M and a path length e+n b if n is larger or equal to M, in which M<N and e.g. M a=(N−M) b. The distance can be determined to a multiple of a from the position of the contrast maximum of the interference fringes on the detector array occurring at a path length c+n a. The distance can be determined to a multiple of b from the position of the contrast maximum of the interference fringes on the detector array occurring at a path length e+n b. However, in the case of an appropriate choice of a and b, the two informations together make it possible to considerably reduce ambiguity sometimes to the extent that it becomes insignificant.

Figure 5B:
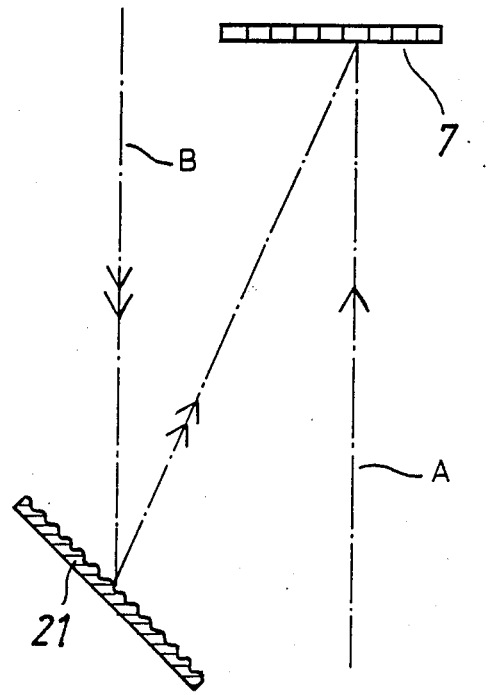
Figure 6:
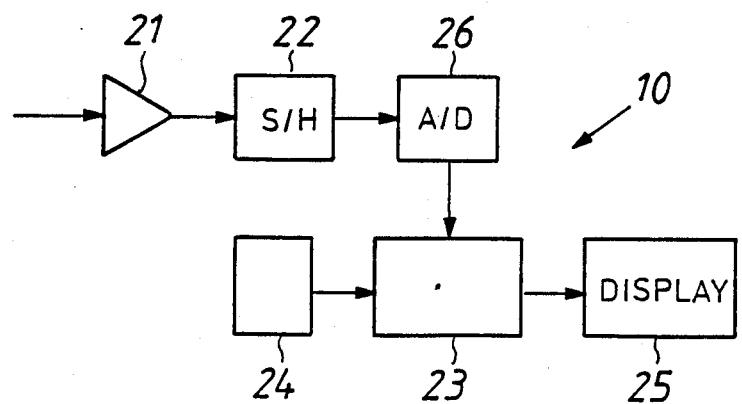

FIG. 5B shows another embodiment, in which in the optical path of the reference beam is arranged an optical grating 21 for varying the optical path length and/or the wavelength. This arrangement makes it possible to increase the distance between the interference fringes, without restricting the path difference range detected by the detector. This has the advantage that conventional detector arrays can without difficulty resolve the interference fringes. If the distance to the target should vary with the time, a pulsed light source is most effective. For the automated evaluation of the signals supplied by the diode array 7, the signal processing means 10 contains, according to the embodiment of FIG. 6, a signal amplifier 21, a sample and hold circuit 22 and a downstream-connected analog-digital converter 26, whose output is led to a computer 23. The computer compares the values obtained from the analog-digital converter with the values stored in reference memory 24 and shows the result on a display means 25 or transfers the values for further processing.

Figure 3:
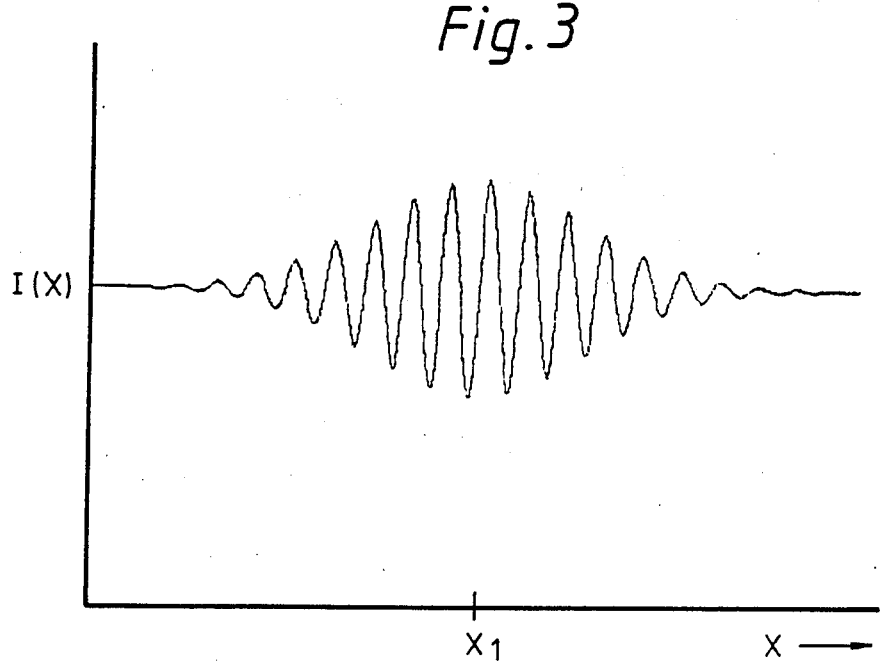
FIG. 3 shows in exemplified manner an intensity distribution I(X) dependent on position X. The envelope curve $G(R_1-R_2)$ represents the measuring criterion used in the present case, the envelope curve being symmetrically distributed about point $X_1$, for which $R_1=R_2$.
Figure 4:
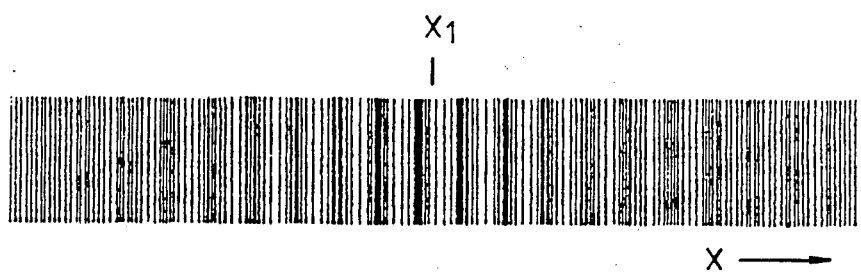
FIG. 4 shows the real picture as is shown on screen S for a measuring arrangement according to FIG. 1. It is possible to see interference fringes in the form of intensity strips, the maximum of the envelope curve $G(R_1-R_2)$ being indicated by maximum contrast strips, indicated here in the centre with R1=R2.

On the basis of various use-related considerations and tests, the following preferred values exist for practical embodiments. In the case of an effective screen width of detector 7 of h=50 mm measured in the X-direction and a wavelength of the light used of 900 nm, as well as a spectral width of the light source of 5 nm, a width W of the envelope curve G according to FIG. 3 of W=200 μm was obtained. In the case of a typical measuring distance of 10 m, a luminous efficiency of the light source of 200 μW, a measuring period of T=1 ms and in the case of a diffuse scattering target, e.g. with a reflection factor of 0.25, a S/N-ratio of 120 was obtained. Under these conditions, at T=2 μs the resolution sigma=0.1 mm. At T=2 ms the resolution is clearly within the range of interferometric precision, without any change to the measuring means being necessary.

The last-mentioned flexibility regarding the measuring precision constitutes a decisive advantage in the case of practical use of the instrument. Approximate measurements and in direct change measurements with maximum precision can be made within a very short time, without any changes or conversions having to be made to the measuring instrument.

While the invention as been described in some detail above, it is to be understood that this detailed description is by way of example only, and the protection granted is to be limited only within the spirit of the invention and the scope of the following claims.

I claim:

1. A range finder for accurately measuring distances, the combination comprising a time partially coherent source means for producing a beam of electromagnetic waves, beam splitter means for splitting said beam from said source into a reference beam and a measuring beam, means defining a reference path for said reference beam, means defining a measuring path for said measuring beam, said measuring path defining means including means to focus said measuring beam onto and to reflect said measuring beam off of a testpiece, position sensitive detector array means, said reference path means and said measuring path means including means to bring said reference beam and said measuring beam into interference with each other and to cause said two beams to be superimposed over at least one zone of path differences between said reference and said measuring beams, whereby a direct determination of the coherence of said two beams can be made based on the intensity distribution of the interferences of said beams on said array means, and program controlled signal processing means for evaluating said intensity distribution, whereby distances concerning the location of said testpiece can be accurately derived by said signal processing means.

2. The range finder of claim 1, said reference path defining means including means to vary the length of said reference beam's optical path.

3. The range finder of claim 1, said measuring path defining means including means to vary the length of said measuring beam's optical path.

4. The range finder of claim 1, said source comprising a continuous light source.

5. The range finder of claim 1, said source comprising a pulsed light source.

6. The range finder of claim 1, said array means comprising an optical grating and a plurality of detectors, means to locate said grating upstream of said plurality of detectors, the spacing in said grating corresponding approximately to the spacing of the interference fringes of said two beams on said array means, and means for causing a time variation in the relative position between said grating and said interference fringes, whereby the resulting time varying moire pattern is projected onto said plurality of detectors.

7. The range finder of claim 6, said time variation causing means comprising an oscillating mirror.

8. The range finder of claim 1, said reference beam defining means including optical means to vary the length of said reference beam's optical path, or to vary the wavelength of said reference beam, or to vary both of said last mentioned path length and said wavelength.

9. The range finder of claim 1, said measuring beam defining means including optical means to vary the length of said measuring beam's optical path, or to vary the wavelength of said measuring beam, or to vary both of said last mentioned path length of said wavelength.

10. The range finder of claim 1, and at least one frequency shifter means for shifting the frequency ratio between said measuring and reference beams.

11. The range finder of claim 10, means for splitting said measuring beam, means for displacing both of the resulting partial split measuring beams with respect to said reference beam, means for passing all of said beams with the aid of said frequency shifter and with no reciprocal path differences to said array means, and non-linear means for mixing said different frequency components and to permit measurements of one component of the mixed signals within a narrow frequency band at about the difference frequency of said two partial split beams.

12. Range finder according to claim 10, characterized in that a beam splitter is provided with the aid of which the reference and measuring beam are split into N parts, numbered 1 to N, that with the aid of a frequency shifter there is a frequency displacement f(i) of the ith partial reference wave with respect to the ith partial measuring wave for all i=1 ... N parts, so that f(i) is not equal to f(j), if i is not equal to j, that the signals of the ith partial reference wave and the ith partial measuring wave are superimposed on the ith detector cell of a N-times position-sensitive detector array and that the signals of the ith detector cell are mixed with those of the jth detector cell, after which the component of the mixed signal is measured in a narrow frequency range around the difference frequency f(i)−f(j) in order to determine the coherence from the result.

13. Range finder according to claim 10, characterized in that at least one beam splitter is provided enabling the reference or measuring beam to be split into N parts, that the individual partial beams are associated with different wavelengths, after which they are so superimposed on the detector array that on observing a point on the detector the nth part has covered a path length c+n a if n is smaller than M and a path length d+n b if n is larger or equal to M.

* * * * *

UNITED STATES PATENT AND TRADEMARK OFFICE
CERTIFICATE OF CORRECTION

PATENT NO. : 4,929,077

DATED : May 29, 1990

INVENTOR(S) : Andre M.J. Huiser

It is certified that error appears in the above-identified patent and that said Letters Patent is hereby corrected as shown below:

On the title page, item [19] and [75] Inventor:

Delete "Huisen" and insert --Huiser--.

Signed and Sealed this

Eighth Day of October, 1991

Attest:

HARRY F. MANBECK, JR.

*Attesting Officer*      *Commissioner of Patents and Trademarks*